United States Patent [19]

Carr

[11] Patent Number: 4,922,998
[45] Date of Patent: May 8, 1990

[54] THERMAL ENERGY STORAGE APPARATUS

[76] Inventor: Peter Carr, 162 Winners Cir., Cary, N.C. 27511

[21] Appl. No.: 117,239

[22] Filed: Nov. 5, 1987

[51] Int. Cl.$^5$ .................. F28D 20/00; F24H 7/04; F25D 3/00
[52] U.S. Cl. ............................ 165/10; 62/59; 62/430; 126/263; 165/43; 165/48.1
[58] Field of Search ................ 165/10; 62/59, 434, 62/430, 435, 439; 126/263

[56] References Cited

U.S. PATENT DOCUMENTS

| | | | |
|---|---|---|---|
| 708,549 | 9/1902 | Heiliger | 126/263 |
| 757,581 | 4/1904 | Turner . | |
| 2,299,307 | 10/1942 | Cornell . | |
| 3,093,308 | 6/1963 | Snelling . | |
| 3,744,272 | 7/1973 | Oldberg | 62/439 |
| 4,091,863 | 5/1978 | Schroder | 165/10 |
| 4,154,292 | 5/1979 | Herrick | 165/10 |
| 4,248,291 | 2/1981 | Jarmul . | |
| 4,302,944 | 12/1981 | Gainer | 62/59 |
| 4,532,110 | 7/1985 | Kapralis et al. . | |
| 4,540,501 | 9/1985 | Ternes et al. | 62/59 |
| 4,678,656 | 7/1987 | Bjorkman, Jr. et al. . | |
| 4,696,338 | 9/1987 | Jensen | 165/104.17 |

Primary Examiner—Albert W. Davis, Jr.
Attorney, Agent, or Firm—Bell, Seltzer, Park & Gibson

[57] ABSTRACT

A thermal energy storage apparatus is disclosed which is adapted for use in motor vehicles to provide immediate cooling, or for use in buildings to provide local area cooling or a reduction in peak energy demand. The apparatus comprises a reservoir which is composed of a plurality of separate containers, each containing water and a gas capable of forming a gas hydrate with the water at a transition temperature above 32° F. Also, at least one movable member is positioned in each container, which serves to facilitate the formation of the gas hydrate at or below the transition temperature. In one specific embodiment, the reservoir is positioned in the circulating air duct in a motor vehicle, so as to permit immediate cooling air flow upon the entry of an occupant. In another embodiment, the reservoir is part of an air conditioning unit which is able to provide cooling in local areas of a building, and to transfer the cooling power load to off-peak hours. In still another embodiment, several reservoirs having different gas hydrates are mounted in series, which is useful when the transition temperature is close to the temperature provided by the the recharging system.

20 Claims, 2 Drawing Sheets

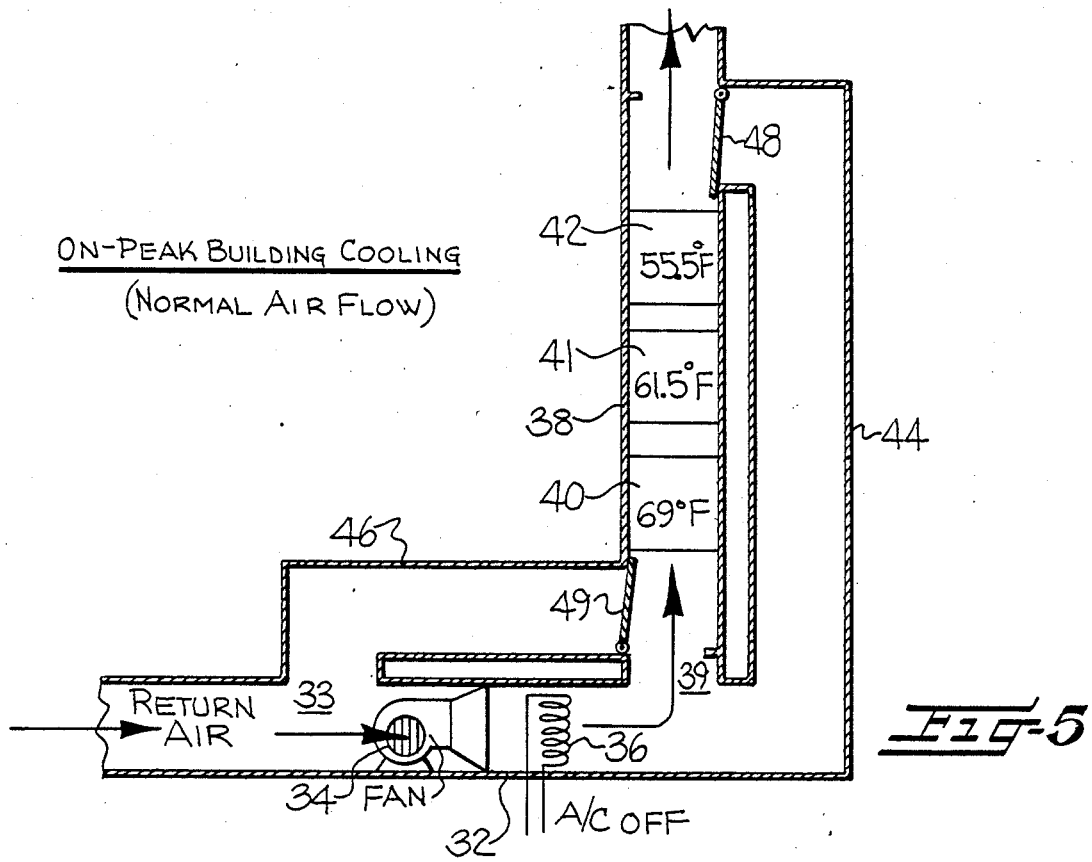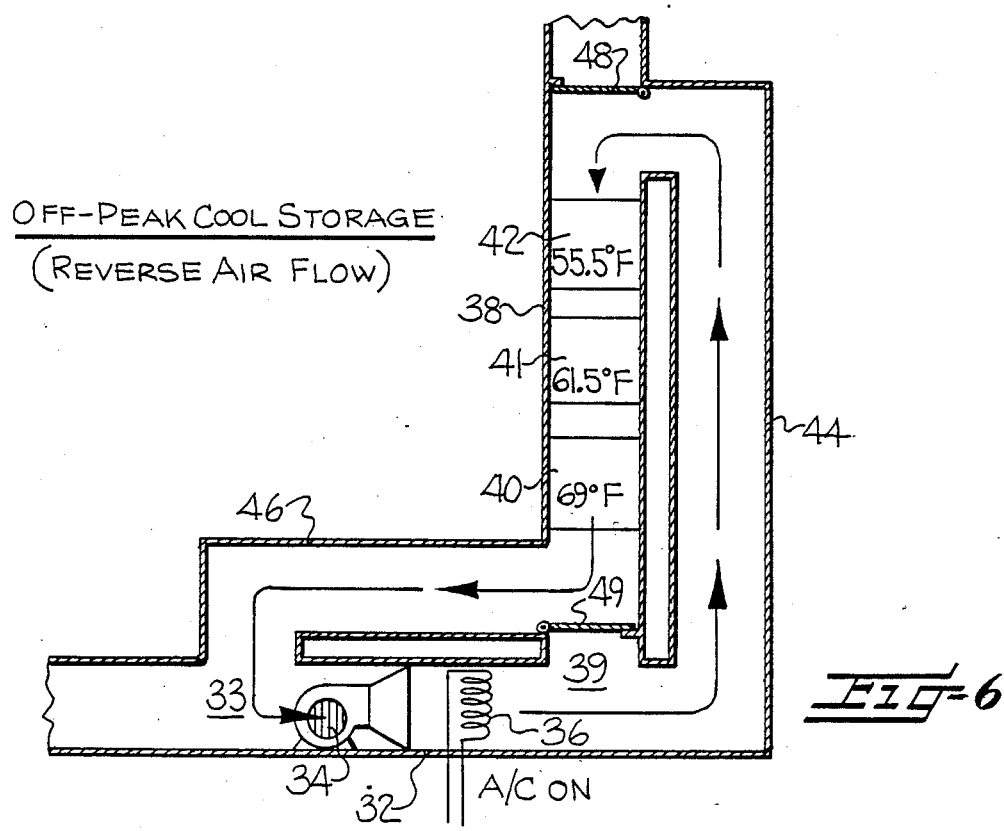

THERMAL ENERGY STORAGE APPARATUS

BACKGROUND OF THE INVENTION

The present invention relates to a thermal energy storage apparatus adapted to transfer thermal energy to or from a moving air stream.

Thermal energy storage systems have heretofore been proposed as a means for shifting power consumption from peak demand periods to off peak periods. For example, it has been proposed to incorporate a cool storage medium in an air conditioning system, with the medium being cooled during off peak hours and then utilized to cool a building during peak hours. The most common storage medium has been water or ice. However, the use of water as a storage medium is not usually practical, since water has a relatively low freezing temperature, and thus the cooling unit must operate below freezing temperature to utilize the heat capacity of the water/ice transition.

It has also been proposed to use gas hydrates as a cool storage medium in an air conditioning system, note for example U.S. Pat. No. 4,540,501 to Ternes et al. Gas hydrates are a class of compounds described as nonstochiometric crystalline solids that are classed as clathrate compounds. More particularly, gas hydrates are solid crystalline structures, with the gas molecules trapped within the ice-type lattice. The trapped gas lends stability to the structure, which permits most such hydrates, which are principally water, to exist as a solid at temperatures well above the 32° F. freezing point of water. The melting or decomposition of such gas hydrates in a sealed tube requires a heat input of approximately 120 Btu/pound. Gas hydrates therefore have cool storage capacity close to that of the ice/water transition (144 Btu/lb), but this capacity is deliverable at higher and more energy efficient temperatures. Thus, gas hydrates have an advantage as compared to pure water when used as a storage medium, in that the transition temperature is well above 32° F., and the transition temperature can lie within the operating temperatures of conventional air conditioning systems.

The use of gas hydrates as a thermal energy storage medium thus has several recognized advantages as noted above. However its actual use has been discouraged by the fact that while the hydrate spontaneously decomposes at its transition temperature, the initial formation of the hydrate requires temperatures much lower than its transition temperature, particularly when all of the hydrate has been decomposed and none remains in the medium.

It is accordingly an object of the present invention to provide a thermal energy storage apparatus which effectively overcomes the above noted limitations and disadvantages of the known systems.

It is a more particular object of the present invention to provide a gas hydrate thermal energy storage apparatus which can be easily adapted for operation with conventional air conditioning or heat pump systems, and which is adapted to function either as a cool storage system or as a low temperature heat storage system.

It is still another object of the present invention to provide a gas hydrate thermal energy storage apparatus which has provision for encouraging hydrate formation at temperatures at or only slightly below the transition temperature.

SUMMARY OF THE PRESENT INVENTION

These and other objects and advantages of the present invention are achieved in the embodiments illustrated herein by the provision of a thermal energy storage apparatus which comprises a sealed container, with a thermal energy storage medium disposed in the container, and with the medium including water and a gas capable of forming a gas hydrate with the water at a temperature above the freezing temperature of water. Also, in the preferred embodiment, a movable mechanical device is mounted for free movement within the container, to facilitate hydrate formation at a temperature at or below the transition temperature of the gas hydrate.

In a specific embodiment of the present invention, the thermal energy storage apparatus includes an air duct, and a plurality of individual sealed containers are mounted within the air duct such that air flowing through the duct is adapted to pass across each of the containers in a heat exchange relationship. Each of the containers includes a gas hydrate forming medium of the described composition. Also, a cooling coil is positioned in the duct, either upstream of the containers or in direct heat exchange contact with the containers. In one specific embodiment of the invention, at least one of the containers has a hydrate forming gas which is different from the hydrate forming gas in the other containers, and such that the hydrate forming temperature is not uniform among the containers.

BRIEF DESCRIPTION OF THE DRAWINGS

Some of the objects and advantages of the present invention having been stated, others will become apparent as the description proceeds when taken in conjunction with the accompanying drawings, in which

FIG. 5 is a schematic representation of a thermal energy storage apparatus of the present invention, and positioned in an otherwise conventional air conditioning system for a building; and FIG. 6 is a view similar to FIG. 4 but showing a modified configuration of the air duct.

DETAILED DESCRIPTION OF THE PREFERRED EMBODIMENTS

Figure 1:
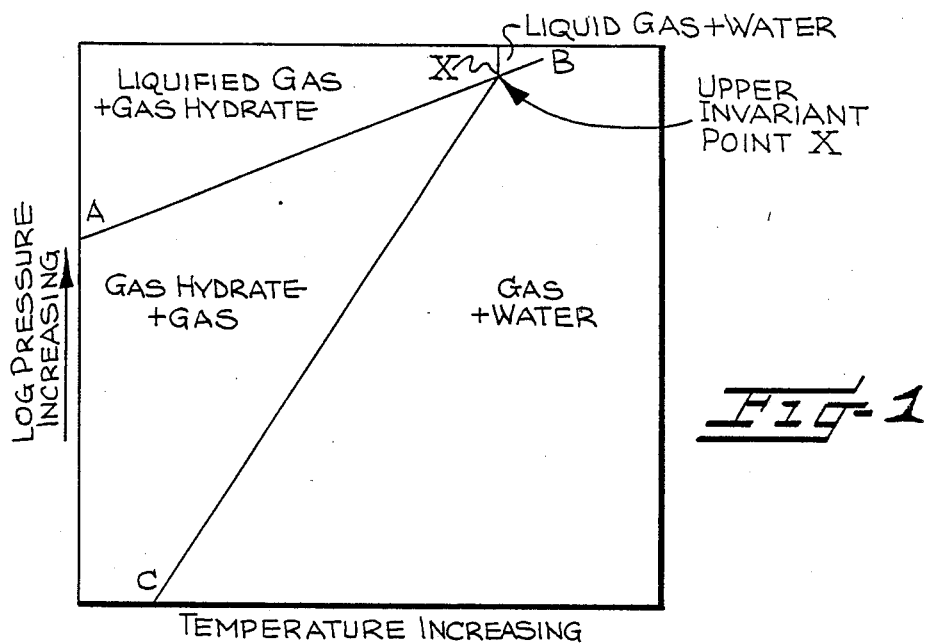
FIG. 1 is a representative phase diagram for a gas hydrate in accordance with the present invention.

Referring more particularly to the drawings, FIG. 1 represents the phase diagram of a typical gas hydrate compound as employed with the present invention. The slopes of the lines AB and CX will vary depending on the gas selected for hydrate formation. On the diagram, the upper invariant point or transition temperature is the major point of reference, since it is at this temperature that in a sealed system, containing a gas hydrate, temperature and pressure will be maintained until all hydrate is decomposed into water, gas and liquified gas. This hydrate decomposition is an endothermic process, that is, heat must be absorbed for the process to proceed. In this manner, heat can be absorbed from the surroundings.

A listing of the upper transition temperatures for a number of gas hydrates is shown in the table below. These examples illustrate the wide variety of gases for which hydrates are known, and provides a partial listing of the invariant points obtainable.

TABLE I

| Upper Invariant Point | | |
|---|---|---|
| Temperature (°F.) | Pressure (psia) | Gas |
| 49.8 | 653 | $CO_2$ |
| 49.8 | 40 | $CHBrF_2$ |
| 50 | 24.5 | $CBrClF_2$ |
| 53.6 | 603 | $N_2O$ |
| 53.6 | 18 | $CH_3SH$ |
| 53.8 | 34 | $SO_2$ |
| 53.8 | 63 | $CCl_2F_2$ |
| 55.6 | 33.5 | $CH_3CClF_2$ |
| 57.2 | 293 | $SF_6$ |
| 58.5 | 492 | $C_2H_6$ |
| 58.5 | 22 | $CH_3Br$ |
| 58.8 | 63 | $CH_3CHF_2$ |
| 59.0 | 485 | $C_2H_2$ |
| 61.2 | 82 | Cyclopropane |
| 61.3 | 112 | $CHClF_2$ |
| 64.2 | 42 | $CH_2ClF$ |
| 65.8 | 470 | $CH_3F$ |
| 68.9 | 72 | $CH_3Cl$ |
| 73.0 | 118 | $C_2H_5F$ |
| 77.0 | 38 | $BrCl$ |
| 82.9 | 123 | $Cl_2$ |
| 82.9 | 257 | $AsH_3$ |
| 85.1 | 325 | $H_2S$ |
| 86.0 | 162 | $H_2Se$ |

The gas hydrate may be formed by placing the selected gas and water in a sealed container in a ratio of about 1 mole gas to 8 to 17 moles of water, with the exact ratio depending on the hydrate formed and the system requirements. Upon cooling of the sealed container to below the upper transition point, a gas hydrate will be formed. Mixtures of gases can also be used to provide different temperatures and pressures than that achievable from the individual gases.

As indicated above, the decomposition of hydrates occurs very readily at or near the upper invariant point. However, the formation of hydrates in a sealed system can require a considerable degree of undercool to encourage nucleation or crystal formation. Once nucleation has occurred, formation of the remaining hydrate occurs very smoothly. For example, if a hydrate is formed with $CCl_2F_2$, more commonly known as Freon 12, in a sealed container, then at temperatures around 54° F. decomposition will occur. If all of the hydrate is not decomposed, then cooling to 52° F. will encourage the reformation of the hydrate, albeit relatively slowly. Cooling to 47° F. will encourage rapid reformation of the hydrate. However, if all of the hydrate is decomposed, i.e. there are no hydrate crystals remaining, then cooling to less than 36° F. with some shaking will usually be required to reform the hydrate. For many applications, it is not practical to always have some hydrate crystals in solution or to provide the 18° F. or more undercooling to promote reformation.

In accordance with the present invention, the undercooling problem is effectively overcome by providing means positioned within the container for providing mechanical movement within the medium, which has been found to facilitate the formation of the gas hydrate at or below the transition temperature. In the preferred embodiment, the movable means comprises a mechanical device which is mounted for free movement within the container. More particularly, the mechanical device, which may be a suitably sized piece of metal or other material, and which is non-reactive to the gas/water mixture, may be moved within the container by external forces or by rocking the container. With Freon 12, hydrate formation occurs very well at about 47° F., when such a mechanical device is moved within the container. In an alternative embodiment, the mechanical device may take the form of one or more metal, glass or ceramic balls which are positioned in the container, and in some instances it may be advantageous for the balls to have slightly irregular surfaces. In still another embodiment, the mechanical device may comprise a magnetic material, with the container being fabricated from a non-magnetic material. A magnetic field on the outside of the container can then create movement of the mechanical device within the container.

Preferably, the mechanical movement is accompanied by mechanical contact between the mechanical device and the walls of the container, or between the devices themselves, since it is believed that the physical contact encourages crystal formation at the contact point. Thus the contact points act as sites for initial crystal formation, and once started, the crystal formation is self sustaining and it readily spreads through the mixture.

Figure 2:
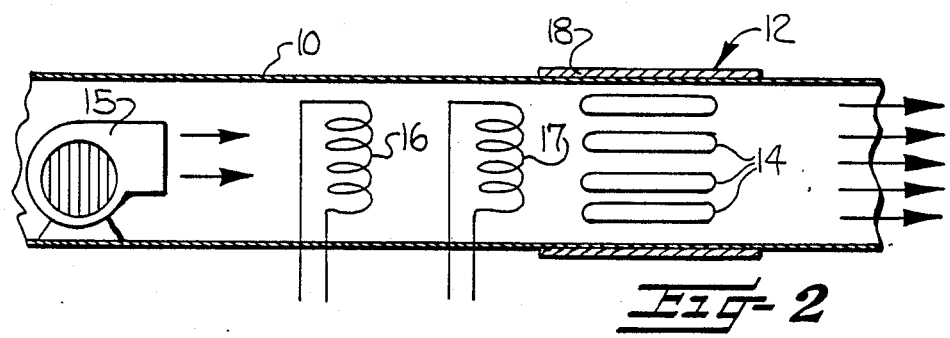
FIG. 2 is a schematic representation of a thermal energy storage apparatus in accordance with one embodiment of the present invention.
Figure 3:
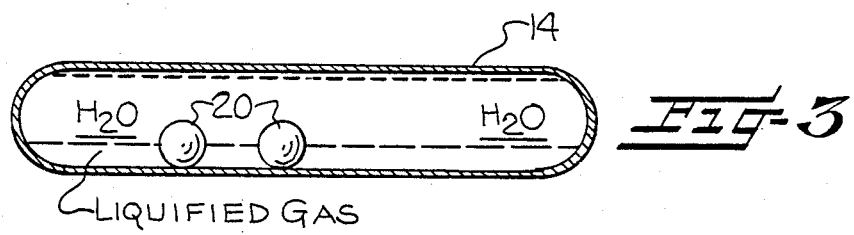
FIG. 3 is an enlarged fragmentary view of one of the gas hydrate chambers shown in FIGS. 2.

FIGS. 2 and 3 illustrate a specific embodiment of the present invention, and wherein the thermal energy storage apparatus is positioned in the distribution air duct 10 of a vehicle, such as an automobile. In this embodiment, the apparatus comprises a cool storage reservoir 12 positioned in the duct 10, and which comprises a plurality of separate sealed containers 14 of elongate tubular configuration, and which are mounted within the air duct downstream of the fan 15 and conventional air conditioning cooling coil 16 and heating coil 17. Thus the air flowing through the duct 10 passes across the cooling and heating coils and then across each of the containers 14 in a heat exchange relationship. It should also be noted that the cooling of the sealed containers 14 can also be effected by direct contact with the cooling coil 16 or the cooling media used to cool the coil 16. System design constraints will dictate whether these alternative approaches are more advantageous than the cold air approach shown in FIG. 2. The portion of the duct 10 surrounding the chambers 14 includes a heat insulating material 18. Also, each of the sealed container 14 includes a gas/water medium capable of forming a gas hydrate at a temperature substantial above 32° F. in the manner described above, and each of the sealed containers preferably includes movable means in the form of two freely movable balls 20 as illustrated schematically in FIG. 3.

When the engine and air conditioning system are operational, the cool air will form the gas hydrate, since by design the temperature of the air leaving the coil 16 is below that required to form the hydrate. Also, it will be understood that the normal movement of the automobile will create motion of the two balls 20 in each container 14, causing them to contact the walls of the container and each other. Upon leaving the car parked after driving, the interior will heat up on a warm day. However, because of the insulation 18 surrounding the air duct, the gas hydrate will decompose only very slowly, and the hydrate will remain in crystalline form for an extended period of time. Thus the operator may switch on the fan upon again entering the car, which will provide immediate cooling until all or at least a portion of the hydrate is decomposed. The fan could be automatically actuated, for example, by the key being turned in the door lock of the automobile. Starting the engine and switching on the air conditioning unit, causes the air conditioning unit to take over the cooling load, and continued operation of the vehicle air conditioning system will reform all of the hydrate so that the cycle of operations may be repeated. In a similar fashion, cooling can be provided for vehicles other than automobiles, such as trucks and commercial vehicles. If needed, vehicle cooling can be provided for extended periods of time simply by increasing the size of the storage reservoir 12.

In the winter, the apparatus illustrated in FIG. 2 can be utilized to provide windshield defrosting or defogging, or background heating. To function in this mode the heating system will be operated so as to allow the heat from the coil 17 to decompose all of the hydrate in the containers 14 when the vehicle is being driven. During a subsequent stand, ice will form on the windshield as it normally would on a cold day. Upon later entering the vehicle, the operator can actuate the fan 15, causing the cold air to be passed over the containers 14 of the thermal storage apparatus. In doing so, hydrate will be formed in the containers 14 and the air will be warmed to a point close to the invariant point of the hydrate. As has been noted previously, this point can be well above 32° F. and the air thus warmed can provide rapid defrosting of the windshield. Once warmed up, some warm air from the engine is directed over the thermal storage device to decompose the hydrate and allow the cycle of operation to be repeated on the next stand.

Figure 4:
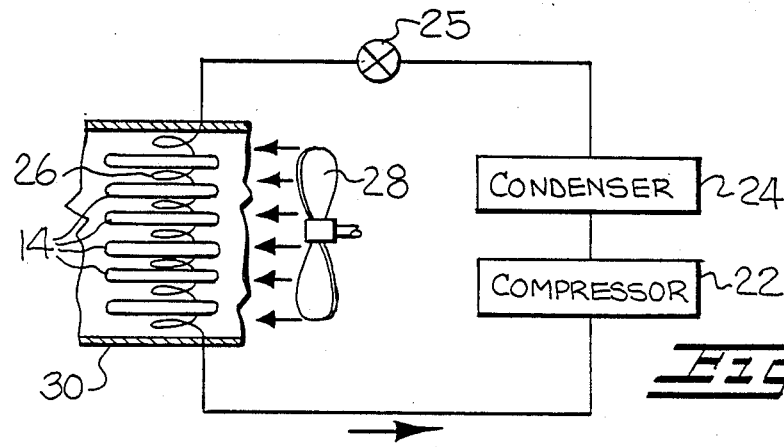
FIG. 4 is a schematic representation of a different embodiment of the present invention.

FIG. 4 illustrates an embodiment of the present invention which is particularly suitable for providing cool storage for a local area air conditioning system in a building. In this regard, it is recognized that the air conditioning systems of many buildings are unable to provide uniform cooling in all areas, such as where heat generating equipment is located or where solar heating is significant. Thus these areas may remain undesirably warm. To alleviate this condition, a relatively small, air conditioning apparatus may be provided as illustrated in FIG. 4, and which comprises a compressor 22, condenser 24, expansion valve 25, evaporator cooling coil 26, and fan 28. All of these components may be mounted to a common support housing so as to render the apparatus portable. The cooling coil 26 is positioned in an insulated duct 30, and is in direct heat exchange contact with a cool storage reservoir in the form of a plurality of sealed containers 14 containing a gas hydrate cool storage medium as described above with respect to FIG. 3. Thus the cool storage medium of the reservoir may be cooled when the work area is not in use, such as at night, and when the heat added by the operation of the compressor can be readily removed by the central air conditioning system. During the day when the central air conditioning system is unable to maintain a comfortable temperature, the fan 28 is turned on and air is blown over the cool storage reservoir to thereby cool the work area. The use of the gas hydrate cooling medium is particularly advantageous in this embodiment as compared to water, since the higher transition temperature of the hydrate significantly lowers the work required by the refrigeration unit to recharge or freeze the medium, and the higher transition temperature also avoids excessive water condensation, which would require periodic water disposal from the apparatus.

When a single temperature gas hydrate system is used to provide cooling, and when the transition temperature of this hydrate is close to the temperature provided by the cooling or recharging system, the recharging time can be excessive. To avoid this limitation, the present invention includes the possibility of cascading, i.e. mounting in series, two or more different gas hydrate reservoirs having different transition temperatures which are selected to lie between the temperature being maintained and the lowest recharging temperature. This has been found to substantially reduce the charging time while retaining operational performance, and the principle of cascaded hydrate reservoirs is equally effective when the gas hydrate system is used to provide heating rather than cooling.

FIGS. 5 and 6 schematically disclose an air conditioning apparatus for a building and which includes groups of gas hydrate storage reservoirs in accordance with the present invention and which are mounted in series in a duct. More particularly, there is disclosed an air duct which includes a first duct segment 32 which has an inlet or return air opening at 33. Also, the first duct segment 32 mounts a fan 34 and a cooling coil 36 from the refrigeration unit. The air duct includes a second duct segment 38 which has an inlet opening 39 which communicates with the downstream or outlet end of the first duct segment 32, and the second segment 38 mounts three cool storage reservoirs 40, 41, 42 in series, with each reservoir comprising a plurality of containers 14 of the type described above. A third duct segment 44 is positioned parallel to the second segment and so as to by-pass the same, and finally, a fourth duct segment 46 is provided which communicates with the upstream end of the second segment 38 and with the upstream end of the first segment at 33 so as to by-pass the fan and cooling coil.

A pivotable baffle 48 is mounted adjacent to the downstream communicating ends of the second and third segments, and a second pivotable baffle 49 is mounted at the upstream end of the second segment and the adjacent end of the fourth segment. By selective operation of these two baffles, the airstream may be directed along a first path so as to pass in series through the three reservoirs in the second segment 38 and as seen in FIG. 5, or the airstream may be directed along a second path and so as to pass through the reservoirs in the opposite direction and as seen in FIG. 6. FIG. 5 thus shows normal air flow during the peak periods, and FIG. 6 shows reverse air flow to reform the gas hydrates during the non-peak periods.

The advantages of a cascaded gas hydrate reservoirs 40, 41, 42 as compared to a single gas hydrate system can best be illustrated by the following example. In this example, the indicated transition temperatures are rounded to the nearest 0.5° F.

Building Air Condition Requirements and General Assumptions

Peak A/C requirement: 27,000 Btu/hr.
Peak duration: 8 hrs.
Total storage required = 8 hrs × 27,000 Btu/hr = 216,000 Btu
Cold air temperature from A/C building coil = 50° F.
Warm air return temperature = 75° F.
Moisture content of the air assumed to be insignificant
Surface area of cool storage array sufficient to cool air to transition temperature One cubic foot/minute of air equivalent to 1.08 Btu/hr/°F.

All hydrates absorb 120 Btu/lb on melting.

EXAMPLE #1

Single Temperature Gas Hydrate Storage

Use $CH_3CClF_2$ with a transition temperature of 55.5° F.

Air flow rate for 27,000 Btu/hr of cooling =

$$\frac{27,000}{(75 - 55.5) \times 1.08} = 1282 \text{ cfm}$$

With perfect heat transfer and 50° F. cold air available the time required to charge the device by removing a total of 216,000 Btu of heat is $$\frac{216,000 \text{ Btu}}{(55.5 - 50)° F. \times 1282 \text{ cfm} \times 1.08 \text{ Btu/°F. hr}} = 28.4 \text{ hrs.}$$

At a fixed flow rate of air of 1282 cfm it would take 28.4 hrs to form sufficient gas hydrate to meet an 8 hour peak demand. This is obviously impractical on a daily basis. Increasing the air flow and/or using a hydrate with a higher transition temperature would be needed to reduce the total charging time.

At 120 Btu/lb a total weight of hydrate of $$\frac{216,000 \text{ Btu}}{120 \text{ Btu/lb}} = 1800 \text{ lb is required}$$

EXAMPLE #2

Cascaded Temperature Gas Hydrate Storage

Reservoir 42: $CH_3CClF_2$ with a transition temperature of 55.5° F.
41: $CHClF_2$ with a transition temperature of 61.5° F.
40: $CH_3Cl$ with a transition temperature of 69° F.

Air flow for 27,000 Btu/hour of cooling =

$$\frac{27,000}{(75 - 55.5) \times 1.08} = 1282 \text{ cfm}$$

Because of the temperatures (gas hydrates) selected, the amount of cooling required for each of the three reservoirs is as follows:

Reservoir 42: $216,000 \times \frac{(61.5 - 55.5)}{(75.0 - 55.5)} = 66,500 \text{ Btu}$ 41: $216,000 \times \frac{(69.0 - 61.5)}{(75.0 - 55.0)} = 83,000 \text{ Btu}$ 40: $216,000 \times \frac{(75.0 - 69.0)}{(75.0 - 55.5)} = 66,500 \text{ Btu}$ The time required to charge each of the reservoirs, utilizing reverse air flow as shown in FIG. 6, is as follows:

Reservoir 42: $\frac{66,500}{(55.5 - 50) \times 1282 \times 1.08} = 8.7 \text{ hrs}$ Reservoir 41: For reservoir 41 a total of 83,000 Btu is required.

For the first 8.7 hours
$8.7 \times (61.5-55.5) \times 1282 \times 1.08 = 72,274$ Btu's are stored The remaining $83,000-72,274=10,726$ Btu's are removed at a rate of $(61.5-50) \times 1282 \times 1.08 = 15,922$ Btu/hr since reservoir 42 is totally charged and has cooled to 50° F. Thus, all of the heat removed from the 50° F. inlet cold air temperature to 61.5° F., the transition temperature of reservoir 41 is now available for cooling of the reservoir 41. At 15,922 Btu/hr the remaining 10,726 Btu's will be removed in $10,726/15,922=0.7$ hours.

The total time to cool reservoir 41 is therefore $8.7+0.7=9.4$ hours

Reservoir 40: Reservoir 40 will cool in $$\frac{66,500}{(69 - 61.5) \times 128 \times 1.08} = 6.4 \text{ hours}$$

The reservoir 41 is thus the rate determining step, and the full 216,000 Btu's will be stored in a total of 9.4 hours. It will thus be seen that cascaded systems make better use of the available cooling and allow practical off-peak storage at close to normal air flows.

The total weight of gas hydrate in each of the three reservoirs is:

42: $\frac{66,500 \text{ Btu}}{120 \text{ Btu/lb}} = 554 \text{ lbs}$

41: $\frac{83,000 \text{ Btu}}{120 \text{ Btu/lb}} = 692 \text{ lbs}$

40: $\frac{66,500 \text{ Btu}}{120 \text{ Btu/lb}} = 554 \text{ lbs}$

The total weight is thus 1800 lbs, which is the same as that needed by a single hydrate. Thus there is no hydrate weight penalty using the cascaded system.

The cascaded gas hydrate apparatus of FIGS. 5-6 could be recharged without reversing the flow of air. However in this instance, each of the reservoirs would be charged in sequence and the total time for charging would be the sum of the individuals. In the example cited this would be:

2.5 hrs for the 69° F. unit, reservoir 40
5.2 hrs for the 61.5° F. unit, reservoir 41
8.7 hrs for the 55.5° F. unit, reservoir 42

The total time for recharge would therefore be 16.4 hours. This is still much shorter than the 28 hours for a single 55.5° F. hydrate system but significantly longer than the reverse flow option.

In the drawings and specification, preferred embodiments of the invention have been illustrated and described, and although specific terms are employed, they are used in a generic and descriptive sense and not for purposes of limitation.

I claim:

1. A thermal energy storage apparatus comprising a sealed container, an energy storage medium disposed in said container, said medium including water and a gas capable of forming a gas hydrate with the water at a transition temperature which is above 32° F., and movable means positioned within said container for providing mechanical movement within the medium and mechanical contact between structural elements of the apparatus within the medium to facilitate the formation of the gas hydrate at or below said transition temperature.

2. The thermal energy storage apparatus as defined in claim 1 wherein said movable means comprises at least one mechanical device positioned for free movement within said container.

3. The thermal energy storage apparatus as defined in claim 2 wherein said container includes heat insulation positioned thereabout.

4. A thermal energy storage apparatus adapted to transfer heat to or from a moving air stream, and comprising
   an air duct,
   a plurality of individual sealed containers mounted within said air duct such that air flowing through said duct is adapted to pass across each of said containers in a heat exchange relationship,
   an energy storage medium disposed in each of said containers, said medium including water and a gas capable of forming a gas hydrate with the water at a transition temperature which is above 32° F., and
   moveable means positioned within each of said containers for providing mechanical movement within the medium and mechanical contact between structural elements of the apparatus within the medium.

5. The thermal energy storage apparatus as defined in claim 4 further comprising a cooling coil positioned in said duct, and blower means for blowing air through said duct in a direction so as to pass across said cooling coil and then across said containers.

6. The thermal energy storage apparatus as defined in claim 4 further comprising a cooling coil positioned to be in direct heat exchange contact with said containers, and blower means for blowing air across said cooling coil and said containers.

7. The thermal energy storage apparatus as defined in claim 4 wherein said movable means comprises a mechanical device mounted for free movement within each of said containers and so as to assist in the formation of the gas hydrate upon movement of the apparatus.

8. The thermal energy storage apparatus as defined in claim 7 wherein the containers are disposed in separate groups of containers, with the groups being positioned in series along said duct, and with the containers of each group having a hydrate forming gas which is different from the hydrate forming gas in at least one of the other groups of said containers, and such that the hydrate forming transition temperature is not uniform among the groups.

9. An air conditioning apparatus adapted to provide local area cooling and comprising
   a plurality of individual sealed containers mounted in an adjacent but spaced apart arrangement, and with an energy storage medium disposed in each of said containers, said medium including water and a gas capable of forming a gas hydrate with the water at a transition temperature which is above 32° F.,
   air conditioning means comprising a compressor, condenser, expansion valve and cooling coil, with said cooling coil being positioned so as to be in heat exchange relation with said containers,
   a fan positioned to direct an air stream across said containers and said cooling coil, and
   moveable means positioned within each of said containers for providing mechanical movement within the medium and mechanical contact between structural elements of the apparatus within the medium.

10. The air conditioning apparatus as defined in claim 9 wherein said movable means includes a mechanical device mounted in each of said containers for free movement therewithin and so as to assist in the formation of the gas hydrate.

11. The air conditioning apparatus as defined in claim 9 wherein said containers, said air conditioning means, and said fan are mounted to a common support housing so as to render the apparatus portable.

12. An air conditioning apparatus adapted for use in a motor vehicle and comprising
   an air duct including a fan for advancing air therethrough,
   air conditioning means including a cooling coil in said duct for selectively cooling the air as it advances through said duct,
   a plurality of individual sealed containers mounted within said air duct such that air flowing through said duct is adapted to pass across each of said containers in a heat exchange relationship and such that the cooling coil in said duct is adapted to cool said containers,
   an energy storage medium disposed in each of said containers, said medium including water and a gas capable of forming a gas hydrate with the water at a transition temperature which is above 32° F., and
   moveable means positioned within each of said containers for providing mechanical movement within the medium and mechanical contact between structural elements of the apparatus within the medium.

13. The air conditioning apparatus as defined in claim 12 further comprising means for selectively heating the air as it advances through said duct.

14. The air conditioning apparatus as defined in claim 12 wherein said movable means comprises a mechanical device mounted for movement within each of said containers and so as to facilitate hydrate formation.

15. An air conditioning apparatus adapted for supplying cooled air to a building or the like, and which is characterized by the ability to shift power consumption from peak demand periods to off peak periods, and comprising
   an air duct,
   a fan for advancing air along the air duct,
   an air conditioning means including a cooling coil which is positioned in said duct downstream of said fan,
   a plurality of individual sealed containers mounted within said air duct such that air flowing through said duct is adapted to pass across each of said containers in a heat exchange relationship, and such that the cooling coil in said duct is adapted to cool said containers,
   and energy storage medium disposed in each of said containers, said medium including water and a gas capable of forming a gas hydrate with the water at a transition temperature which is above 32° F, and
   moveable means positioned within each of said containers for providing mechanical movement within the medium and mechanical contact between structural elements of the apparatus within the medium.

16. The air conditioning apparatus as defined in claim 15 wherein said movable means comprises a mechanical device mounted for movement within each of said containers and so as to facilitate hydrate formation.

17. An air conditioning apparatus adapted for supplying cooled air to a building or the like, and which is characterized by the ability to shift power consumption from peak demand periods to off peak periods, and comprising an air duct, a fan for advancing air along the air duct, an air conditioning means including a cooling coil which is positioned in said duct downstream of said fan, a plurality of groups of individual sealed containers mounted within said air duct downstream of said cooling coil, and with the groups being disposed in a series arrangement along said duct, and such that air flowing through said duct is adapted to pass across each of said containers of each of said groups in a heat exchange relationship, and an energy storage medium disposed in each of said containers, said medium including water and a gas capable of forming a gas hydrate with the water at a transition temperature which is above 32° F., and with the containers of each group having a hydrate forming gas which is different from the hydrate forming gas in at least one of the other groups of said containers, and such that the hydrate forming transition temperature is not uniform among the groups, and moveable means positioned within each of said containers for providing mechanical movement within the medium and mechanical contact between structural elements of the apparatus within the medium.

18. The air conditioning apparatus as defined in claim 17 wherein said movable means comprises a mechanical device mounted for movement within each of said containers and so as to facilitate hydrate formation.

19. The air conditioning apparatus as defined in claim 17 wherein said air duct comprises a first duct segment having an inlet end, and an outlet end, and mounting said fan and said cooling coil therein, a second duct segment having one end communicating with the outlet end of said first duct segment and an opposite end, said second duct segment mounting said groups of containers in a series arrangement therein, a third duct segment positioned parallel to and by-passing said second duct segment, and a fourth duct segment communicating with said one end of said second duct segment and with the inlet end of the said first duct segment and by-passing said fan and cooling coil of said first duct segment, and baffle means for selectively directing the advancing air from said fan and cooling coil along a first path through said groups of containers in said second duct segment and to said opposite end thereof, and a second path through said third duct segment, then in an opposite direction through said groups of containers and then through said fourth duct segment and to the upstream end of said first duct segment.

20. The air conditioning apparatus as defined in claim 19 wherein there are at least three of said groups of containers, and wherein the transition temperatures of said groups progressively decrease from group to group, with the direction of the decrease corresponding to the downstream direction when the air advances along said first path.

* * * * *